United States Patent
Cai (10) Patent No.: US 7,249,348 B2
(45) Date of Patent: Jul. 24, 2007

(54) NON-INTERFERING STATUS INQUIRY FOR USER THREADS

(75) Inventor: Weidong Cai, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 632 days.

(21) Appl. No.: 10/689,900

(22) Filed: Oct. 21, 2003

(65) Prior Publication Data

US 2005/0198080 A1    Sep. 8, 2005

(51) Int. Cl.
    *G06F 9/44*    (2006.01)
(52) U.S. Cl. .......................... 717/124; 718/1
(58) Field of Classification Search ............... 717/124, 717/129; 718/1, 100, 101–108
    See application file for complete search history.

(56) References Cited

U.S. PATENT DOCUMENTS

| | | | | |
|---|---|---|---|---|
| 5,771,385 A * | 6/1998 | Harper | ....................... | 717/128 |
| 5,889,988 A * | 3/1999 | Held | .......................... | 718/103 |
| 5,946,474 A * | 8/1999 | Skogby | ...................... | 703/13 |
| 6,061,709 A * | 5/2000 | Bronte | ....................... | 718/103 |
| 6,754,851 B2 * | 6/2004 | Yoshimura | .................. | 714/38 |
| 6,988,264 B2 * | 1/2006 | Sarma et al. | ............... | 717/128 |
| 7,111,307 B1 * | 9/2006 | Wang | ......................... | 719/321 |
| 7,137,126 B1 * | 11/2006 | Coffman et al. | ........... | 719/328 |
| 7,152,225 B2 * | 12/2006 | Hargreaves | .................. | 717/124 |
| 7,207,041 B2 * | 4/2007 | Elson et al. | ................ | 718/104 |

OTHER PUBLICATIONS

"Windows 2000 Kernel Debugging", Steven McDowell, Jan. 5, 2001, pp. vii-30,69-126,137-147.*
"Operating System Concepts" Fourth Edition, Abraham Silberschatz et al, p. 116, 1994.*
Norton, Scott J. and Dipasquale, Mark D., "ThreadTime:The Multithreaded Programming Guide", 1997, Chapter 2, pp. 15-31, Prentice Hall PTR.

* cited by examiner

*Primary Examiner*—Todd Ingberg (57) ABSTRACT

One embodiment disclosed relates to a method of obtaining status information from user threads of a target process. A system call is performed from a querying process. The system call creates a kernel debug thread in a kernel entity of the target process. The kernel debug thread further creates a user status thread in a user entity of the target process. The method may be used to obtain the status information without stopping the target process. Another embodiment disclosed relates to an operating system with capability to obtain status information from user threads of a target process. The operating system includes at least the following first and second system calls. The first system call is configured to create a kernel debug thread in a kernel entity of the target process. The second system call is configured to awake the kernel debug thread and pass information to the kernel debug thread.

14 Claims, 6 Drawing Sheets

Target Process 300

NON-INTERFERING STATUS INQUIRY FOR USER THREADS

BACKGROUND OF THE INVENTION

1. Field of the Invention

The present invention relates generally to computer systems and software and more particularly to multi-threaded computing.

2. Description of the Background Art

A thread, composed of a context and a sequence of instructions to execute, may be defined as an independent flow of control within a process. The context may comprise a register set and a program counter.

A thread model operating system is capable of managing single threaded as well as multi-threaded processes. As described in "Thread Time: A Multithreaded Programming Guide" by Scott J. Norton and Mark D. DiPasquale, Prentice Hall, 1997, there are different types of thread models.

A many-to-one (M×1) thread model may also be referred to as a user threads implementation. The M×1 model is implemented in user space and does not necessarily require kernel modifications to support single-threaded as well as multithreaded processes. In the M×1 model, there can be many user threads, but only one kernel-scheduled entity (i.e. only one kernel thread). When the kernel scheduler selects a multithreaded process to run, the user scheduler in the threads library may plug in the context of the highest priority, runnable user thread. The kernel process then executes on behalf of that thread. While the kernel views the M×1 model process as single threaded, the threads library scheduler can switch between runnable threads in the process.

A 1×1 thread model (sometimes referred to as N×N) is generally implemented in kernel space rather than in user space. Hence, this model may be referred to as a kernel threads implementation. In the 1×1 model, there is one kernel thread for every user thread. Each user thread is permanently bound to a corresponding kernel-scheduled entity (i.e. to a corresponding kernel thread). The kernel thread can execute kernel code or system calls on behalf of its corresponding user thread. This model utilizes the kernel scheduler only; the user space scheduler is not needed.

The M×N thread model is implemented in both user and kernel space. Like the 1×1 model, the M×N model requires kernel modifications and so may be referred to as a kernel threads implementation. In the M×N model, there can be many user threads and any number of kernel threads. The M×N model allows user threads to be multiplexed on top of kernel threads or to be bound to kernel threads as necessary to suit program requirements. In addition to the kernel scheduler, the M×N model utilizes the user space scheduler to schedule user threads to run on kernel threads available in the process. The kernel scheduler schedules kernel threads to run on processors available in the system.

SUMMARY

One embodiment of the invention pertains to a method of obtaining status information from user threads of a target process. A system call is performed from a querying process. The system call creates a kernel debug thread in a kernel entity of the target process. The kernel debug thread further creates a user status thread in a user entity of the target process. The method may be used to obtain the status information without stopping the target process.

Another embodiment of the invention relates to an operating system with capability to obtain status information from user threads of a target process. The operating system includes at least the following first and second system calls. The first system call is configured to create a kernel debug thread in a kernel entity of the target process. The second system call is configured to awake the kernel debug thread and pass information to the kernel debug thread.

DETAILED DESCRIPTION

It is desirable to be able to query the status of user threads in a multi-threaded process. The status information can include, but is not limited to, the state of individual threads, the registers of individual threads, and process-wide information. Unfortunately, conventional techniques for obtaining such status information typically requires stopping the target process.

Figure 1:
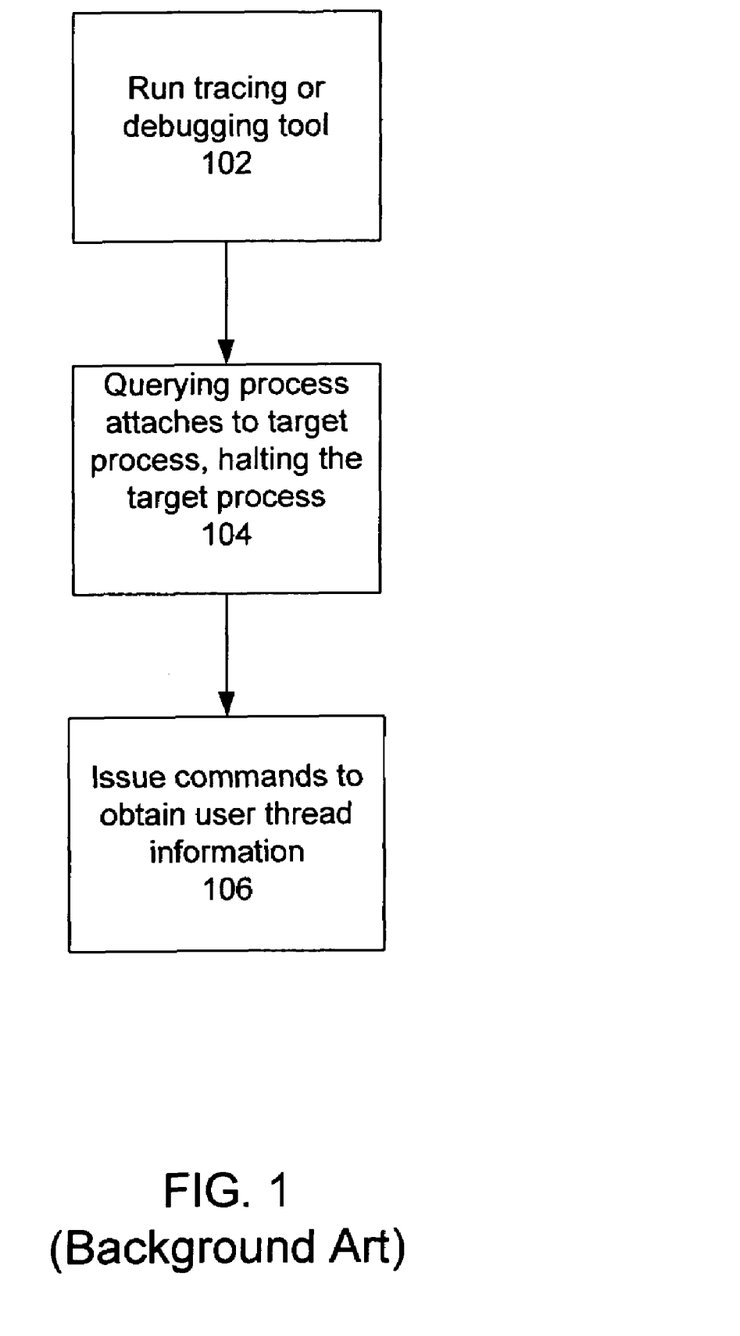
FIG. 1 is a flow chart depicting a conventional method wherein a tracing or debugging tool is used to obtain status data regarding a target process.

FIG. 1 is a flow chart depicting a conventional method wherein a tracing or debugging tool is used to obtain status data regarding a target process. In this prior method, the tracing or debugging tool is run 102. The querying process of the tool attaches 104 to the target process. By this attachment to the target process, the target process is halted or stopped. Subsequently, commands may be issued 106 to obtain the user thread status information.

Figure 2:
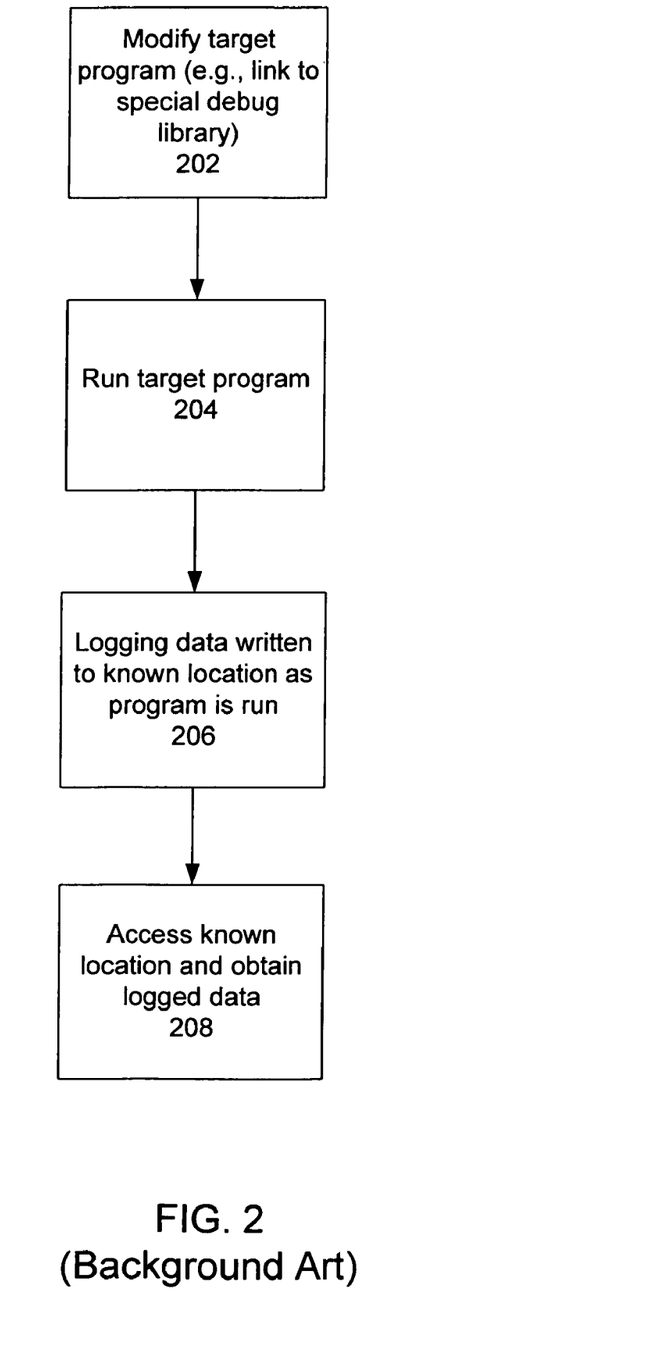
FIG. 2 is a flow chart depicting another conventional method wherein the target process itself writes logging data.

FIG. 2 is a flow chart depicting another conventional method wherein the target process itself writes logging data. In this prior method, the target program is modified 202 so that it writes out the logging data when it is run. For example, instead of linking the target program to the production thread library ("libpthread"), the target program may be linked to a special debug library ("libpthread_tr") which is configured so as to provide the logging functionality. Thereafter, when the target program is run 204, the logging data is written 206 to a known location. This known location may be accessed 208 to obtain the logged data.

Figure 3:
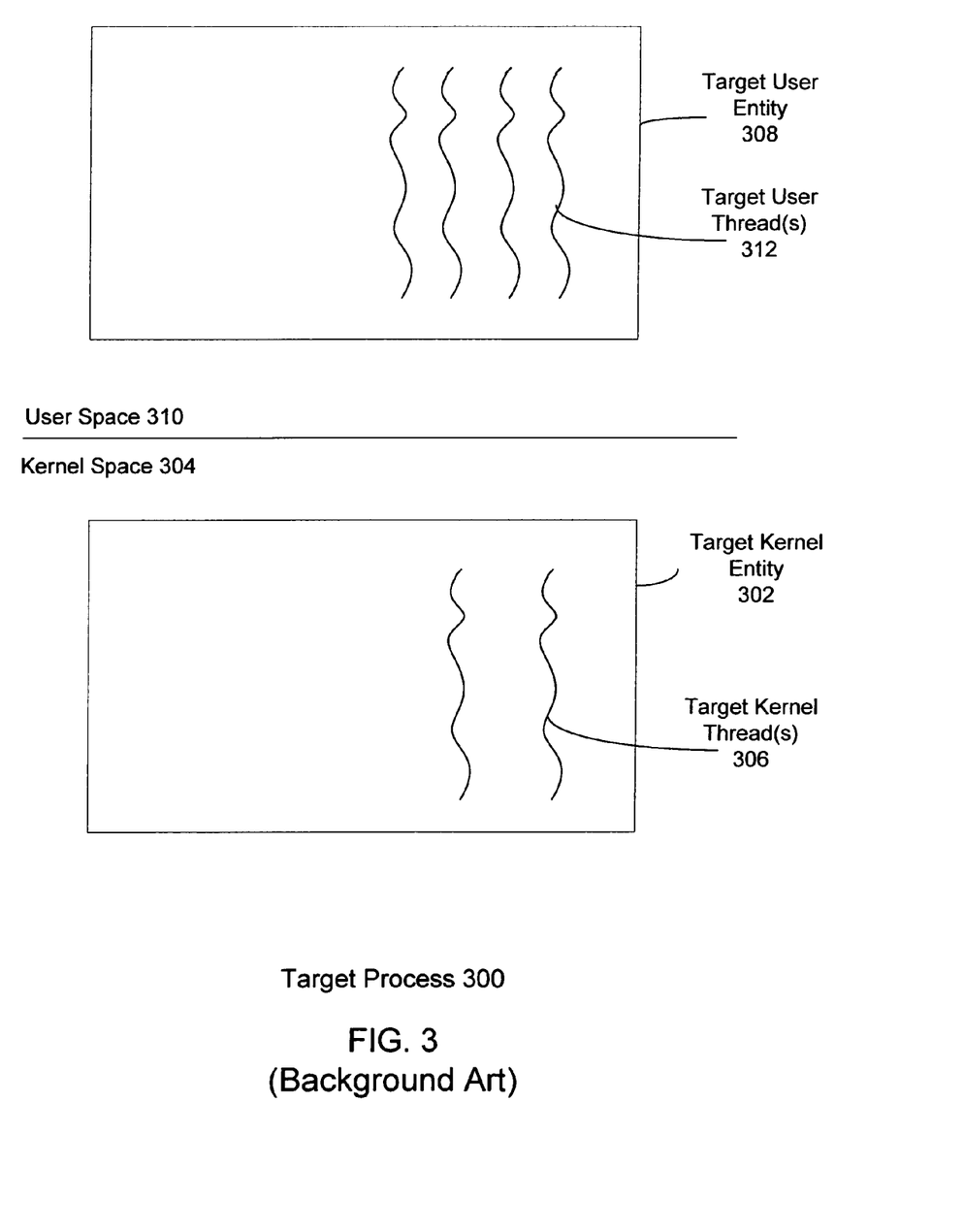
FIG. 3 is a schematic diagram depicting an example multi-threaded target process.

FIG. 3 is a schematic diagram depicting an example multi-threaded target process 300. User thread status information may be desired from such a target process 300. The example target process 300 illustrated in FIG. 3 comprises a process based on an M×N thread model.

The target process 300 may comprise a target kernel entity 302 in kernel space 304 and a target user entity 308 in user space 310. One or more target kernel thread(s) 306 may be running in the kernel entity, and one or more target user thread(s) 312 may be running in the user entity.

Figure 4:
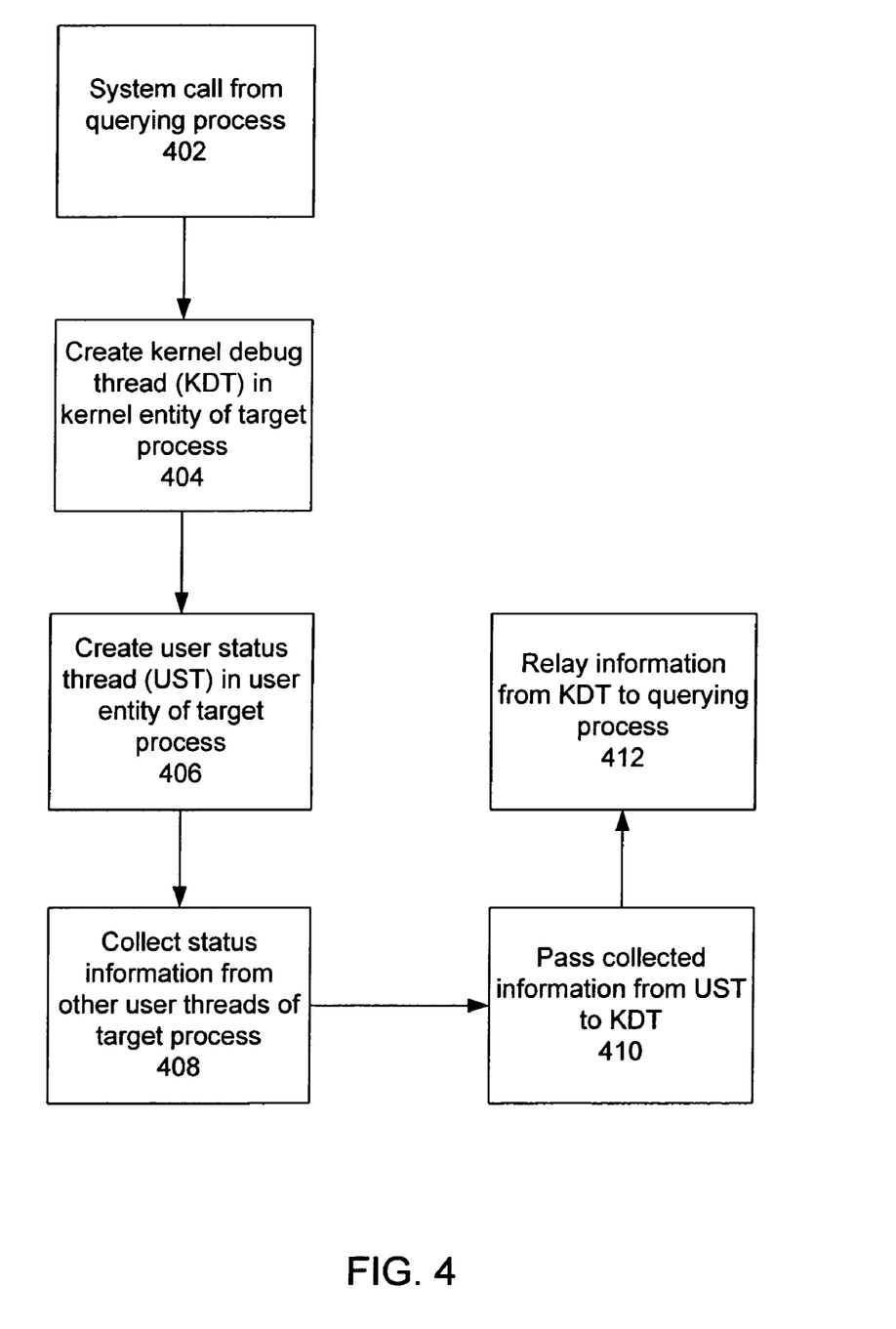
FIG. 4 is a flow chart depicting a method for performing a non-interfering status inquiry to obtain user thread information in accordance with an embodiment of the invention.
Figure 5:
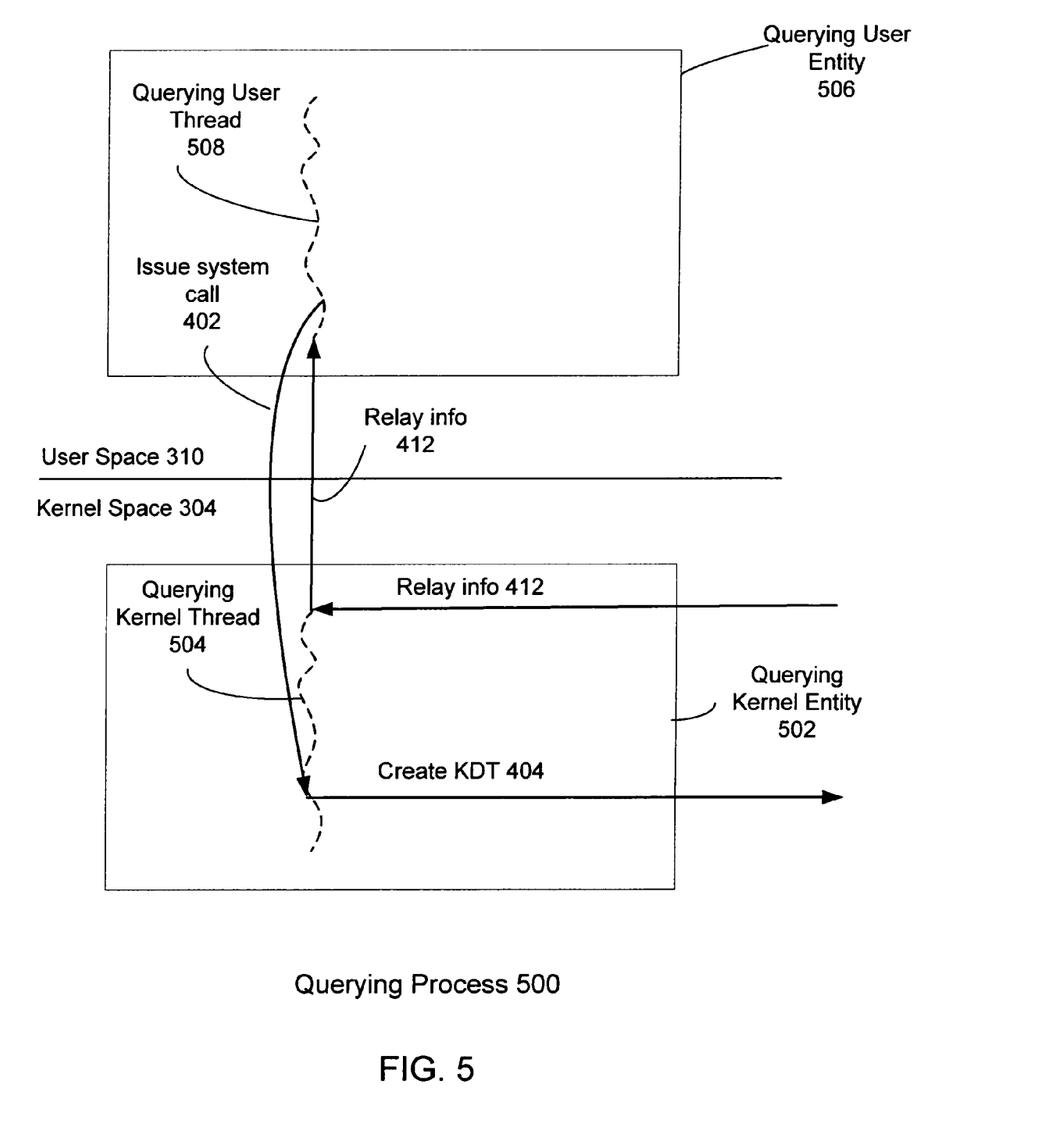
FIG. 5 is a schematic diagram of a querying process and related steps in accordance with an embodiment of the invention.
Figure 6:
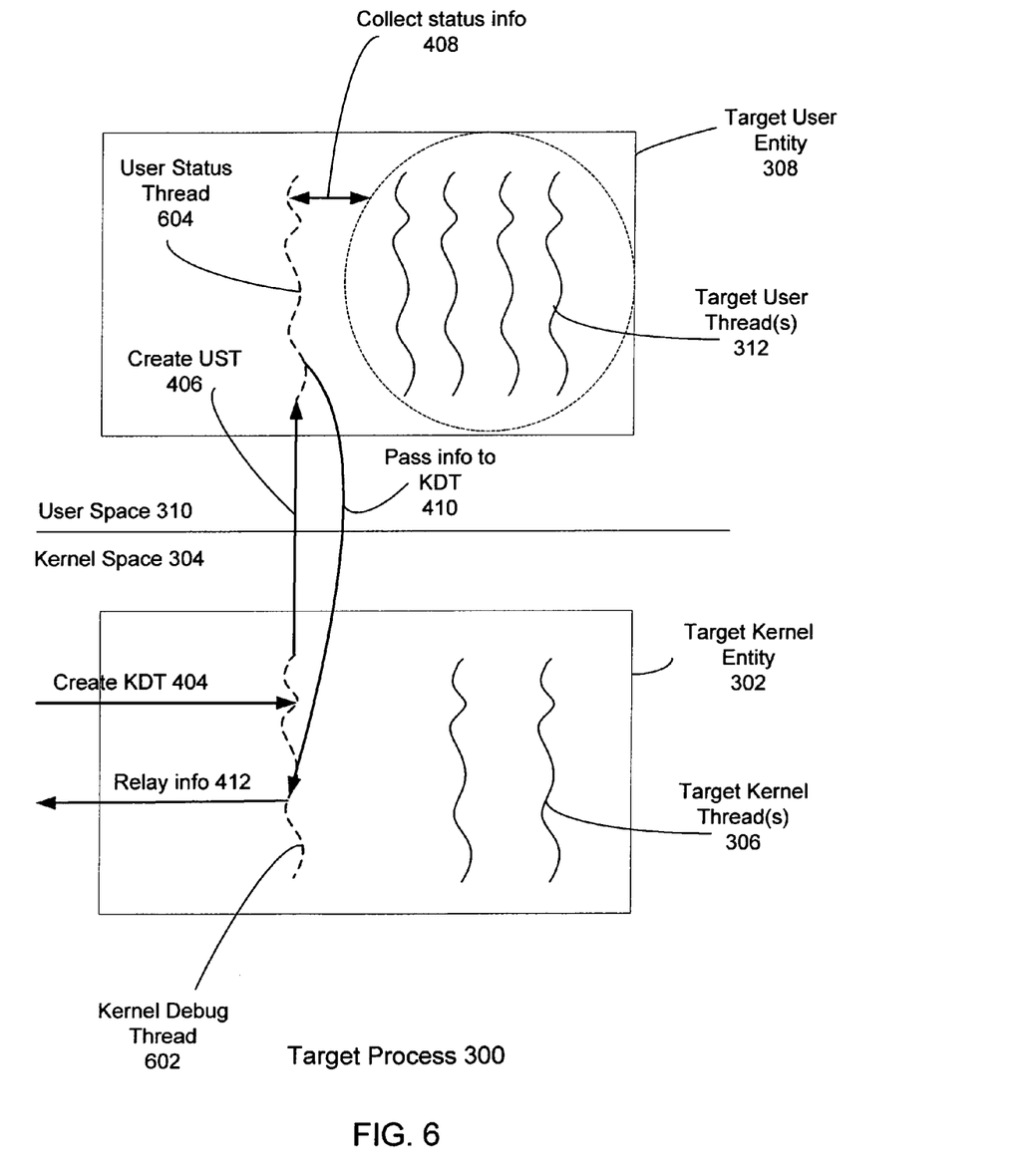
FIG. 6 is a schematic diagram of the target process and related steps in accordance with an embodiment of the invention.

FIG. 4 is a flow chart depicting a method for performing a non-interfering status inquiry to obtain user thread information in accordance with an embodiment of the invention. The method of FIG. 4 is discussed below in conjunction with FIGS. 5 and 6. FIG. 5 is a schematic diagram of a querying process and related steps in accordance with an embodiment of the invention. FIG. 6 is a schematic diagram of the target process and related steps in accordance with an embodiment of the invention.

In one embodiment, a querying process 500 (see FIG. 5) utilizes an appropriately configured first kernel interface to issue 402 an inquiry about the target process. The inquiry may take the form of a system call from a querying user thread 508 in the querying user entity 506 to a querying kernel thread 504 in the querying kernel entity 502. The system call is configured for the querying purpose and creates 404 a kernel debug thread (KDT) 602 (see FIG. 6) in the target kernel entity 302 of the target process 300.

The KDT 602 creates 406 a user status thread (UST) 604 in the target user entity 308. The UST 604 collects 408 status information from other user threads 312 in the target user entity 308. In one embodiment, the UST 604 may be first created in the kernel as a scheduler activation (SA) and then come up to user space when necessary via a designated upcall handler registered at the thread library (libpthread) startup time. An SA comprises a special kernel thread in an M×N thread model. The SA has capability to switch between different user threads during its lifetime. An upcall handler comprises a mechanism in an M×N thread model that enables kernel SAs to come up to user space and execute body functions of user threads.

The UST 604 passes 410 the collected user thread information to the KDT 602. In one embodiment, a second kernel interface may be configured for the UST 604 to communicate 410 the collected information to the KDT 602. Thereafter, in one embodiment, the UST 604 may go into a "sleep" state until awaken by the KDT 602 when a new inquiry comes in.

The KDT 602 relays 412 the collected information back to the querying process 500. In the querying process 500, the relayed information is received by the querying kernel thread 504 and passed on to the querying user thread 508.

Advantageously, the above-described method does not require stopping of the target process 300. Furthermore, if the query is about data other than registers, none of the user threads needs to be halted. If the query is about a user thread's registers, the UST 604 may issue a thread library API (application programming interface) call to temporarily suspend the target user thread. After reading the target user thread's registers, the UST 604 may issue another thread library API call to resume or continue the target user thread.

Advantageously, the UST 604 may be "invisible" to the user threads created by the target application. When the target process 300 exits, the UST 604 will be terminated.

In accordance with one embodiment, there is no need to re-create the KDT 602 or the UST 604 upon subsequent inquiries. They may go into a sleep state such that they can be awaken for those subsequent inquiries. In accordance with another embodiment, the KDT 602 and the UST 604 may be terminated after the inquiry is fulfilled and re-created for subsequent inquiries.

In accordance with an embodiment of the invention, an operating system is modified to implement the above-described method. The operating system includes at least the following first and second system calls. The first system call configured to create a kernel debug thread in a kernel entity of the target process. The second system call configured to awake the kernel debug thread and pass information to the kernel debug thread. In addition, the operating system may include a thread library configured to register a user status thread's stack and data memory and a body function configured to sleep until awaken to act upon a user thread status inquiry.

The above-description describes an embodiment of the invention implemented in conjunction with an operating system having an M×N thread model. It may also be possible to utilize the invention or aspects thereof with other thread models.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of obtaining status information from user threads of a target process, the method comprising:
    performing a system call from a querying process;
    creating a kernel debug thread in a kernel entity of the target process;
    creating a user status thread in a user entity of the target process; and
    collecting status information by the user status thread from other user threads of the target process.

2. The method of claim 1, further comprising:
    passing the collected status information from the user status thread to the kernel debug thread.

3. The method of claim 2, wherein the user status thread goes into a sleep state after passing the collected status information to the kernel debug thread.

4. The method of claim 2, further comprising:
    relaying the collected status information from the kernel debug thread to the querying process.

5. The method of claim 4, wherein the kernel debug thread goes into a sleep state after relaying the collected status information to the querying process.

6. The method of claim 1, wherein the method is performed in conjunction with an operating system having an M×N thread model.

7. The method of claim 1, wherein the kernel debug thread is created by the system call.

8. The method of claim 1, wherein the user status thread is first created in the kernel entity as a scheduler activation and then comes up to the user entity via an upcall handler.

9. The method of claim 1, wherein the status information does not relate to registers of the user threads, and wherein none of the user threads need to be halted.

10. The method of claim 1, wherein the status information relates to at least one register of a user thread, and wherein the user thread is temporarily suspended.

11. The method of claim 1, wherein the method does not require stopping of the target process.

12. A computer apparatus having an operating system with capability to obtain status information from user threads of a target process so as to debug the target process without requiring stopping the target process, the computer apparatus comprising:
- a processor configured to execute program instructions;
- memory configured to store program instructions and data; and
- processor-readable instructions for a first system call configured to create a kernel debug thread in a kernel entity of the target process; and
- processor-readable instructions for a second system call configured to awake the kernel debug thread and pass information to the kernel debug thread.

13. The computer apparatus of claim 12, further comprising:
- processor-readable instructions for a thread library configured to register a user status thread's stack and data memory.

14. The operating system computer apparatus of claim 13, further comprising:
- processor-readable instructions for a body function in a thread library which is configured to sleep until awaken to act upon a user thread status inquiry.

* * * * *

UNITED STATES PATENT AND TRADEMARK OFFICE
CERTIFICATE OF CORRECTION

PATENT NO. : 7,249,348 B2 Page 1 of 1
APPLICATION NO. : 10/689900
DATED : July 24, 2007
INVENTOR(S) : Weidong Cai It is certified that error appears in the above-identified patent and that said Letters Patent is hereby corrected as shown below:

In column 6, line 10, in Claim 14, after "The" delete "operating system".

Signed and Sealed this

Fifteenth Day of July, 2008

JON W. DUDAS
*Director of the United States Patent and Trademark Office*